Patented Oct. 12, 1948

2,451,180

UNITED STATES PATENT OFFICE 2,451,180

CATALYSTS FOR THE POLYMERIZATION OF BUTADIENE-1,3 HYDROCARBONS

William D. Stewart, Akron, Ohio, assignor to The B. F. Goodrich Company, New York, N. Y., a corporation of New York No Drawing. Application February 13, 1943, Serial No. 475,795

14 Claims. (Cl. 260—84.5)

1

This invention relates to the polymerization in aqueous emulsion of butadiene-1,3 hydrocarbons either alone or in admixture with each other or with other unsaturated organic compounds copolymerizable therewith in aqueous emulsion, and has as its principal object to provide new catalysts or accelerators for such polymerizations by the use of which improved polymers may be obtained in increased yield and in a very short interval of time. This application is a continuation-in-part of my copending application Serial No. 379,712 filed February 19, 1941, now abandoned.

It has already been proposed in U. S. Patent 1,935,733 to Tschunkur and Bock to polymerize butadiene-1,3 hydrocarbons in presence of an oxidizing agent and a metallic salt such as the salts of cobalt, lead, manganese, chromium and nickel. In the process of that patent, however, the metallic salt, which may be either a soluble or insoluble salt, is added in concentrations greater than 1 part of the salt to 200 parts of the butadiene, or greater than 0.5% based on the material polymerized, and polymerization is effected only after allowing an emulsion containing the butadiene, oxidizing agent and metallic salt to stand for a few days at a temperature of 60° C., I have now discovered that the presence of exceedingly small amounts of simple water-soluble salts of certain metallic elements, either with or without the simultaneous presence of known initiators and accelerators of polymerization such as oxidizing agents greatly increases the speed of polymerization of butadiene-1,3 hydrocarbons and enables such polymerizations to be effected in only a few hours and at a temperature of only 20–30° C. Since lower temperatures for polymerization may be employed, products of improved physical properties may be obtained.

Accordingly, this invention is concerned with the use of small concentrations of simple water-soluble salts of metallic elements as catalysts for the aqueous emulsion polymerization of butadiene-1,3 hydrocarbons. The salts employed in this invention are the simple water-soluble salts of the metals occurring in group VIII of the Mendeleef Periodic Table including iron, cobalt, nickel, palladium, osmium, platinum, etc. The salts of those elements occurring in the first long period of the periodic table as well as in group VIII, specifically iron, cobalt and nickel, are preferred.

The term "water-soluble" as applied to these metal salts is used to signify that the salts are appreciably soluble in water, at least to the extent of 0.1 g. in 100 cc. of water at 20° C., while the term "simple" as applied to these salts is meant to denote that the metallic atom present in such a salt exerts one of its normal primary valences as distinguished from "complex compounds" wherein the metallic atom is united to other atoms in the compound by coordinated valences. Typical examples of salts to be used in this invention include the chlorides, nitrates, iodides, bromides, sulfates, sulfites, nitrites, thiocyanates, etc. of iron, cobalt, nickel and other group VIII metals provided they are water-soluble. Water-soluble salts of these metals with organic acids such as the acetates, formates, oxalates, tartrates and citrates may also be employed. Either the oxidized or reduced form of those metals capable of existing in more than one valence is effective, for example, both ferrous sulfate and ferric sulfate are operable. Mixed salts, acid salts and basic salts which are water-soluble, ferrous ammonium sulfate for instance, may also be used.

The concentration of these salts in the emulsion to be polymerized is a critical part of the invention since the remarkable catalytic effect of these salts on polymerization is exerted only when small concentrations are used. In general the amount of salt should not exceed 0.1% of the quantity of material polymerized nor should it exceed 0.1% of the quantity of water present in the emulsion. Since a larger amount of water than of monomers is normally present when conducting polymerization in aqueous emulsion, the concentration of salt based on the material polymerized is the limiting factor. Preferably, from about 0.001 to 5 parts of the metallic salt for each 10,000 parts of material polymerized, that is, from 0.00001 to 0.05% should be employed.

As has been mentioned hereinabove, the metal salt catalysts of this invention may be used in the polymerization in aqueous emulsion of any of the butadiene-1,3 hydrocarbons by which is meant butadiene-1,3 itself and its hydrocarbon homologs which polymerize in essentially the same manner such as isoprene, 2,3-dimethyl butadiene-1,3, piperylene, etc. either alone or in admixture with each other and/or in admixture with one or more other unsaturated organic compounds which are copolymerizable therewith in aqueous emulsion. Monomers copolymerizable with butadiene-1,3 hydrocarbons in aqueous emulsion generally are polymerizable compounds containing the structure

where at least two of the disconnected valences are attached to hydrogen and at least one of the disconnected valences is attached to a group more electronegative than alkyl groups. Typical examples of such groups include unsaturated hydrocarbon groups such as vinyl or phenyl, groups containing a

structure such as carboxy and ester groups, cyano groups, halogen etc. Vinyl and vinylidene compounds particularly are generally copolymerizable with butadiene-1,3 hydrocarbons in aqueous emulsion. Specific monomers copolymerizable with butadiene-1,3 hydrocarbons in aqueous emulsion include styrene, p-chloro styrene, p-methoxy styrene, vinyl naphthalene, acrylonitrile, methacrylonitrile, acrylic acid, methacrylic acid, methyl acrylate, butyl acrylate, methyl methacrylate, ethyl methacrylate, methacrylamide, methyl vinyl ketone, methyl isopropenyl ketone, vinylidene chloride, vinyl furane, diethyl fumarate, chloroprene and the like. It is preferable in this invention, that these copolymerizable monomers, when polymerized in admixture with butadiene-1,3 hydrocarbons, be present in minor proportions by weight since monomer mixtures containing predominant amounts of butadiene-1,3 hydrocarbons yield synthetic rubbers when polymerized. However, the catalysts of this invention may be employed when any mixture of a butadiene-1,3 hydrocarbon with a monomer copolymerizable therewith is copolymerized in aqueous emulsion.

In the practice of the invention the monomer or monomer mixture to be polymerized is emulsified in water with the aid of an emulsifying agent to form an aqueous emulsion. Preferably the water-soluble metal salts of this invention are then added to the emulsion together, if desired, with various other substances, such as polymerization initiators, polymerization accelerators, polymerization modifiers, or even other polymerization catalysts, which may be present during the polymerization. However, it is also possible to add the metal salt to the water prior to emulsification or to form the water-soluble salt in situ. By this latter procedure it is possible, for example, to add metallic iron or an acid-soluble iron compound together with an acid to the emulsion or, to add only the metallic iron or acid-soluble iron compound if the emulsion is already acid, since these materials will interact to give the desired water-soluble iron salt.

The emulsion containing the materials to be polymerized and the metal salt catalysts in the proper concentration is then preferably agitated at a temperature of about 20–100° C. until polymerization is substantially complete. This usually requires from 5 to 50 hours at 30° C. or an even shorter time at higher temperatures. The resulting polymerized product is in the form of a latex-like dispersion which may be coagulated in the usual way to yield the solid polymer.

Emulsifying agents which may be used in the above process include partially or completely neutralized fatty acid soaps such as sodium oleate and sodium myristate, hymolal sulfates and sulfonates such as sodium lauryl sulfate and sodium isobutyl naphthalene sulfonate, and other well-known emulsifying agents.

Polymerization initiators which are preferably but not essentially present in the emulsion during the polymerization include oxygen-yielding compounds such as hydrogen peroxide, organic peroxides, potassium persulfate, sodium perborate, sodium periodate, potassium percarbonate, oxygen, ozonides and the like. The catalysts of this invention may also be employed when the polymerization is initiated by other types of initiators such as diazoamino benzene and sulfur dioxide. However, it is to be understood that when the metal salts of this invention are present in the emulsion, rapid polymerizations are possible even in the absence of a polymerization initiator. Hence it may be said that these salts are themselves capable of initiating polymerizations.

Polymerization modifiers such as dialkyl dixanthogens, mercaptans, tetra-alkyl thiuram disulfides and other sulfur-containing organic compounds which enable polymers of increased solubility and plasticity to be prepared may also be present in the emulsion during the polymerization.

It is believed that the function of the metal salts employed in catalyzing polymerization resides in their ability to undergo or to catalyze oxidation-reduction reactions; and that the oxidation reduction reactions occurring activate the monomer molecules to such an extent that they are then capable of adding on to one another in a rapid chain reaction which finally produces the polymer. This same function is also believed to be exerted by many other catalysts containing a heavy metal such as iron, cobalt and nickel, combined with various other compounds such as pyrophosphates, laevulinic acid, glycine, beta-mercapto ethanol, quebrachitol, cholesterol and the like, which catalysts are more fully disclosed in my copending applications Serial Nos. 379,713 to 379,717 filed February 19, 1941, now Patents 2,380,473 to 2,380,477, issued July 31, 1945.

As an example of the method of carrying out the invention and in order to illustrate the desirable results obtained by employing the water-soluble salts of group VIII metals as catalysts for the emulsion polymerization of butadiene-1,3 hydrocarbons, an aqueous emulsion containing the following ingredients is prepared:

| | Parts |
|---|---|
| Butadiene-1,3 | 55 |
| Acrylonitrile | 45 |
| Hydrogen peroxide (3½% solution) | 10 |
| Emulsifying solution (2% aqueous solution of myristic acid 85% neutralized with NaOH) | 250 |
| Di-isopropyl dixanthogen disulfide | 0.3 |

This emulsion is then divided into four parts, to one of which is added 0.01% by weight based on the weight of the monomers of ferric sulfate, to another an equal amount of cobaltous chloride and to the third an equal amount of nickel sulfate while the fourth contains no metal salt. The four portions are then polymerized in sealed glass tubes at a constant temperature of 30° C. The yields obtained, the time required for polymerization, the solubility in acetone of the resulting copolymer, and the tensile strength and ultimate elongation of a vulcanizate obtained by compounding the copolymers in a standard test recipe and vulcanizing are shown as follows:

| Metal Salt | Yield | Time | Solubility of Polymer in Acetone | Tensile Strength of Vulcanizate | Elongation of Vulcanizate |
|---|---|---|---|---|---|
| | Percent | Hours | Percent | Lbs./sq. in. | Percent |
| None | 98 | 45 | 28 | 5,000 | 620 |
| Ferric Sulfate | 98 | 40 | 42 | 5,500 | 700 |
| Cobalt Chloride | 98 | 29 | 40 | 5,600 | 710 |
| Nickel Sulfate | 98 | 29 | 38 | 5,400 | 680 |

It is seen that the use of the metal salts allows the polymerization to take place in a shorter time and that more soluble, plastic copolymers which yield vulcanizates having improved physical properties are obtained.

In other embodiments of the invention aqueous emulsions containing butadiene-1,3 and acrylonitrile prepared as indicated above are polymerized in sealed glass tubes at 30° C. in the presence of various water-soluble group VIII metal salts. The following table shows the increase in speed of polymerization brought about by the presence of such salts.

| Metal Salt | Concentration of Salt (percent by weight based on monomers) | Yield after 14 hrs. | Yield after 28 hrs. | Yield after 38 hrs. |
|---|---|---|---|---|
| | Percent | Percent | Percent | Percent |
| None | | 56 | 86 | 95 |
| Ferrous ammonium sulfate | 0.01 | 82 | 91 | 96 |
| Do | 0.005 | 86 | 94 | 98 |
| Cobalt chloride | 0.01 | 83 | 93 | 96 |
| Do | 0.005 | 89 | 98 | |
| Nickel sulfate | 0.01 | 80 | 90 | 95 |

In another embodiment of the invention a mixture of 55 parts butadiene-1,3 and 45 parts acrylonitrile is emulsified in 250 parts of an aqueous solution of sodium myristate. A small amount of a polymerization modifier and 0.01 part of cobaltous chloride are then added to the emulsion and the emulsion is allowed to polymerize. A 98% yield of a plastic rubber butadiene-1,3 acrylonitrile copolymer is obtained in 31 hours. In the absence of cobaltous chloride no polymerization occurs in over 150 hours since it is noted that in this embodiment no oxygen-yielding polymerization initiator is used with the metal salt.

In still another embodiment of the invention an emulsion containing the following ingredients is polymerized at 30° C.

| | Parts |
|---|---|
| Butadiene-1,3 | 70 |
| Styrene | 30 |
| Water | 250 |
| Fatty acid soap | 5 |
| Hydrogen-peroxide | 0.35 |
| Polymerization modifier | 0.45 |
| Cobaltous chloride | 0.02 |

The polymerization requires 35 hours to produce a 98% yield of a plastic synthetic rubber. In the absence of the cobaltous chloride the polymerization requires over 150 hours. When the example is repeated, except that the hydrogen peroxide is omitted, the polymerization requires 53 hours to give an 86% yield but when both the hydrogen peroxide and the cobaltous chloride are omitted no polymerization at all occurs in a week. When the polymerization of this example is repeated using methyl methacrylate instead of styrene as the copolymerizable monomer, a 100% yield of a plastic synthetic rubber is obtained in 73 hours while in the absence of the metal salt the polymerization requires over 200 hours.

It will be obvious to those skilled in the art that many modifications in the nature and proportions of materials polymerized, in the nature of the metallic salt and in the nature and proportions of other substances present in the emulsion may be made in the above specific examples, in accordance with the broad disclosure herein, without departing from the spirit and scope of the invention as defined by the appended claims.

I claim:

1. The method which comprises preparing an aqueous emulsion containing water and a lesser amount of polymerizable material comprising a butadiene-1,3 hydrocarbon, adding to the water of said emulsion from about 0.00001 to 0.05% by weight based on the total polymerizable material present of a simple ionizable salt of a metal occurring in group VIII of the periodic table, the said salt being one which is capable of dissolving in water at least to the extent of 0.1 g. in 100 cc. of water at 20° C., and polymerizing the butadiene-1,3 hydrocarbon in the aqueous emulsion in the presence of the added salt, whereby the rate of polymerization is substantially increased.

2. The method of claim 1 wherein the metal salt is a salt of iron.

3. The method of claim 1 wherein the metal salt is a salt of nickel.

4. The method which comprises preparing an aqueous emulsion containing water and a lesser amount of a monomeric mixture of butadiene-1,3 and another unsaturated compound copolymerizable therewith in aqueous emulsion, adding to the water of said emulsion from about 0.00001 to 0.05% by weight based on the monomeric mixture of a simple ionizable salt of a metal occurring in group VIII and the first long period of the periodic table, the said salt being one which is capable of dissolving in water at least to the extent of 0.1 g. in 100 cc. of water at 20° C., and polymerizing the said monomeric mixture in the aqueous emulsion in the presence of the added salt, whereby the rate of polymerization is substantially increased.

5. The method of claim 4 further characterized in that the polymerization of the monomeric mixture in the aqueous emulsion is effected in the presence of an oxygen-yielding initiator of polymerization.

6. The method of claim 4 wherein the monomeric mixture is a mixture of butadiene-1,3 and acrylonitrile.

7. The method which comprises preparing an aqueous emulsion containing water and a lesser amount of a monomeric mixture of butadiene-1,3 and another unsaturated compound copolymerizable therewith in aqueous emulsion, adding to the water of said emulsion about 0.01% by weight based on the monomeric mixture of a simple ionizable salt of a metal occurring in group VIII and the first long period of the periodic table, the said salt being one which is capable of dissolving in water at least to the extent of 0.1 g. in 100 cc. of water at 20° C., and polymerizing the said monomeric mixture in the aqueous emulsion in the presence of the added salt, whereby the rate of polymerization is substantially increased.

8. The method of claim 7 wherein the metal salt is ferric sulfate.

9. The method of claim 7 wherein the metal salt is nickel sulfate.

10. The method of claim 7 wherein the monomeric mixture is a mixture of butadiene-1,3 and acrylonitrile.

11. The method which comprises preparing an aqueous emulsion containing about 250 parts of water and about 100 parts of a monomeric mixture of about 55 parts of butadiene-1,3 and about 45 parts of acrylonitrile, adding to the water of said emulsion about 0.01 part of cobaltous chloride, and polymerizing the monomeric mixture in the aqueous emulsion in the presence of the cobaltous chloride, whereby the rate of polymerization is substantially increased.

12. The method of claim 11 further characterized in that the polmerization of the monomeric mixture is aqueous emulsion is effected in the presence of hydrogen peroxide.

13. The method which comprises preparing an aqueous emulsion containing water and a lesser amount of polymerizable material comprising a butadiene-1,3 hydrocarbon, adding to the water of said emulsion from about 0.00001 to 0.05% by weight based on the total polymerizable material present of a simple ionizable salt of cobalt, the said salt being one which is capable of dissolving in water at least to the extent of 0.1 g. in 100 cc. of water at 20° C., and polymerizing the butadiene-1,3 hydrocarbon in the aqueous emulsion in the presence of the added salt, whereby the rate of polymerization is substantially increased.

14. The method which comprises preparing an aqueous emulsion containing water and a lesser amount of a monomeric mixture of butadiene-1,3 and another unsaturated compound copolymerizable therewith in aqueous emulsion, adding to the water of said emulsion about 0.01% by weight based on the monomeric mixture of a simple ionizable salt of cobalt, the said salt being one which is capable of dissolving in water at least to the extent of 0.1 g. in 100 cc. of water at 20° C., and polymerizing the said monomeric mixture in the aqueous emulsion in the presence of the added salt, whereby the rate of the polymerization is substantially increased.

WILLIAM D. STEWART.

REFERENCES CITED

The following references are of record in the file of this patent:

UNITED STATES PATENTS

| Number | Name | Date |
|---|---|---|
| 1,935,733 | Tschunkur | Nov. 21, 1933 |
| 2,218,362 | Starkweather et al. | Oct. 15, 1940 |
| 2,317,858 | Soday | Apr. 27, 1943 |
| 2,377,752 | Britton et al. | June 5, 1945 |

OTHER REFERENCES

Pages 744–747, "Lange's Handbook of Chemistry," published 1944 by Handbook Publishers Inc., Sandusky, Ohio.